(12) United States Patent
Lohaus

(10) Patent No.: US 6,513,637 B2  
(45) Date of Patent: Feb. 4, 2003

(54) CLUTCH DISK HAVING INTEGRAL FIXING MEMBERS

(75) Inventor: Norbert Lohaus, Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/734,349

(22) Filed: Dec. 11, 2000

(65) Prior Publication Data

US 2001/0011627 A1 Aug. 9, 2001

(30) Foreign Application Priority Data

Dec. 10, 1999 (DE) .......................................... 199 59 585

(51) Int. Cl.$^7$ ............................................... F16D 13/64
(52) U.S. Cl. ................................ 192/107 R; 192/107 C
(58) Field of Search ........................... 192/107 R, 107 C

(56) References Cited

U.S. PATENT DOCUMENTS

| 2,630,199 A | | 3/1953 | Gamble |
| 4,580,673 A | * | 4/1986 | Graton ................. 188/218 XL |
| 4,854,438 A | * | 8/1989 | Weissenberger et al. .... 192/107 M |
| 4,865,177 A | * | 9/1989 | Murakami .............. 192/107 C |
| 6,216,836 B1 | * | 4/2001 | Illig et al. ............... 192/107 R |

* cited by examiner

Primary Examiner—Saul Rodriguez  
(74) Attorney, Agent, or Firm—Cohen, Pontani, Lieberman & Pavane

(57) ABSTRACT

In a clutch disk for a motor vehicle clutch, fixing members which are produced in one piece with carrier plates of friction linings and are provided to engage behind edges of a recess in an adjacent component have a base that covers the recess, this providing the fixing members with a particularly high stability. The number of fixing members may therefore be kept particularly low.

8 Claims, 2 Drawing Sheets

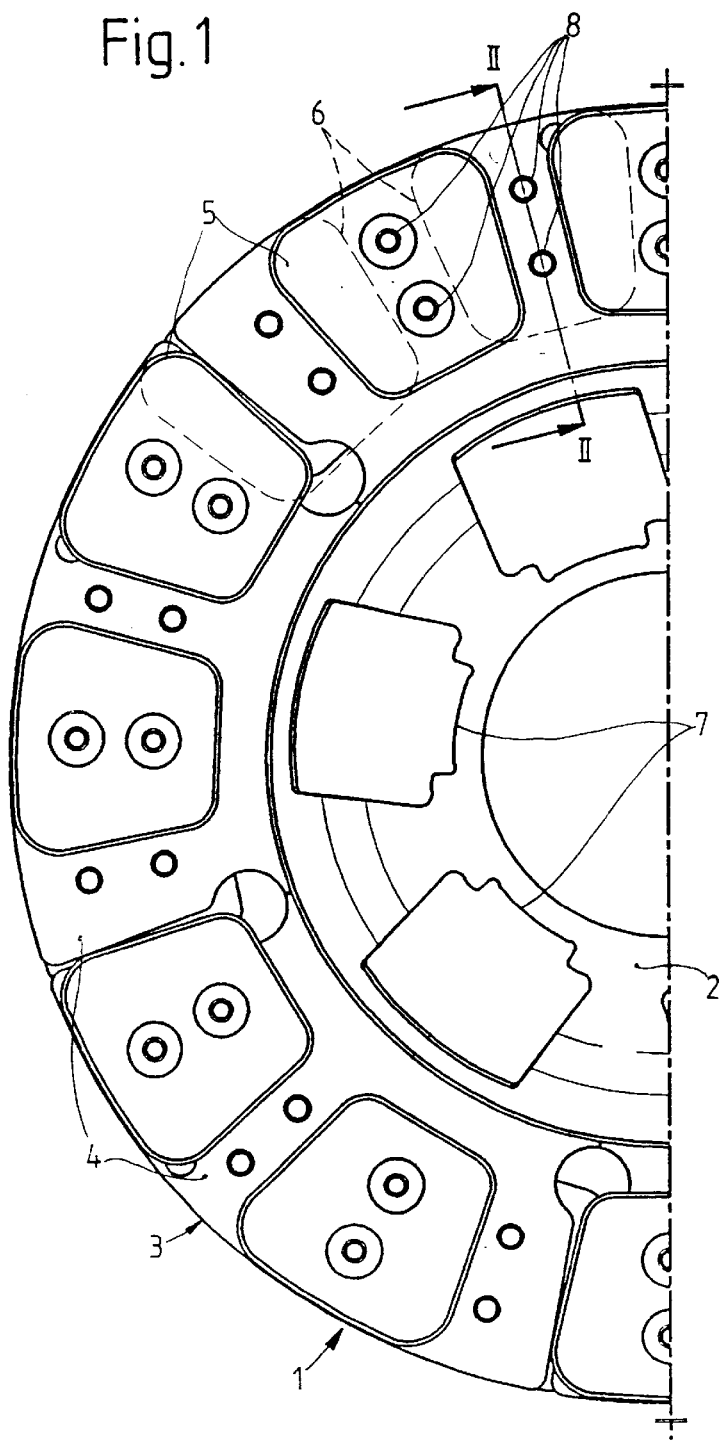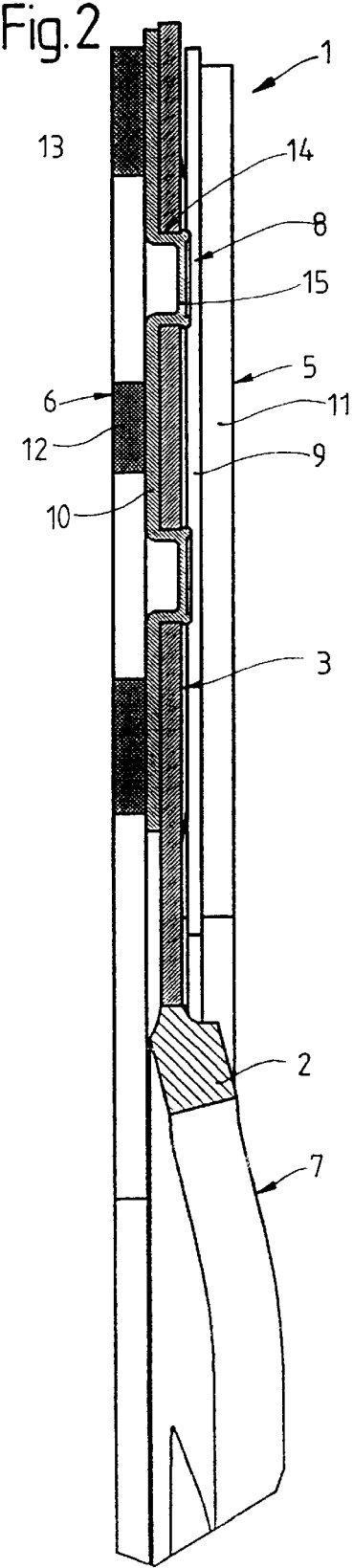

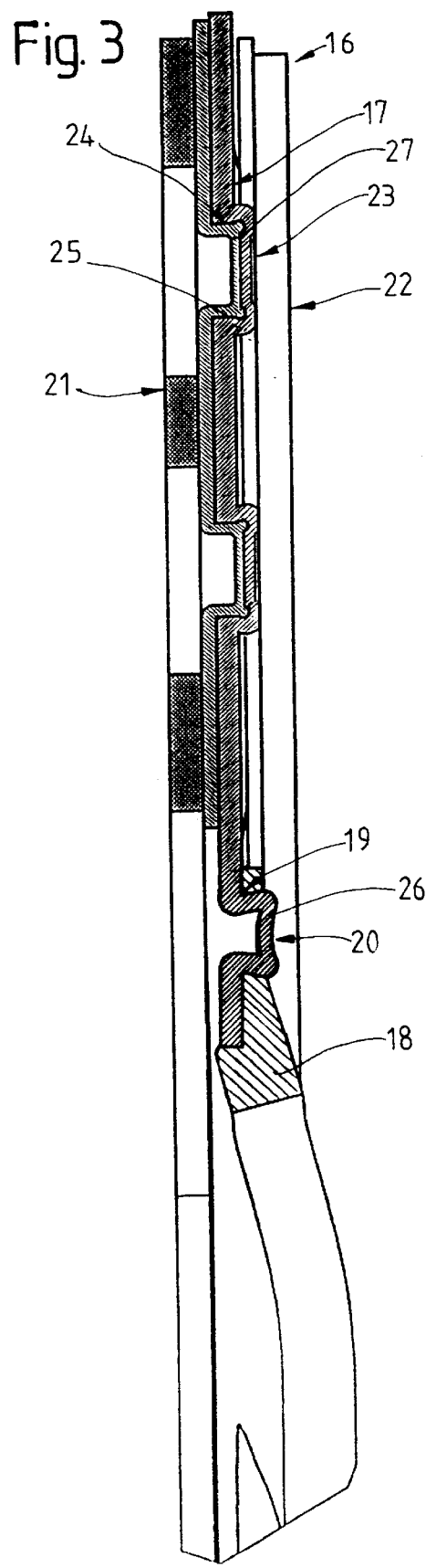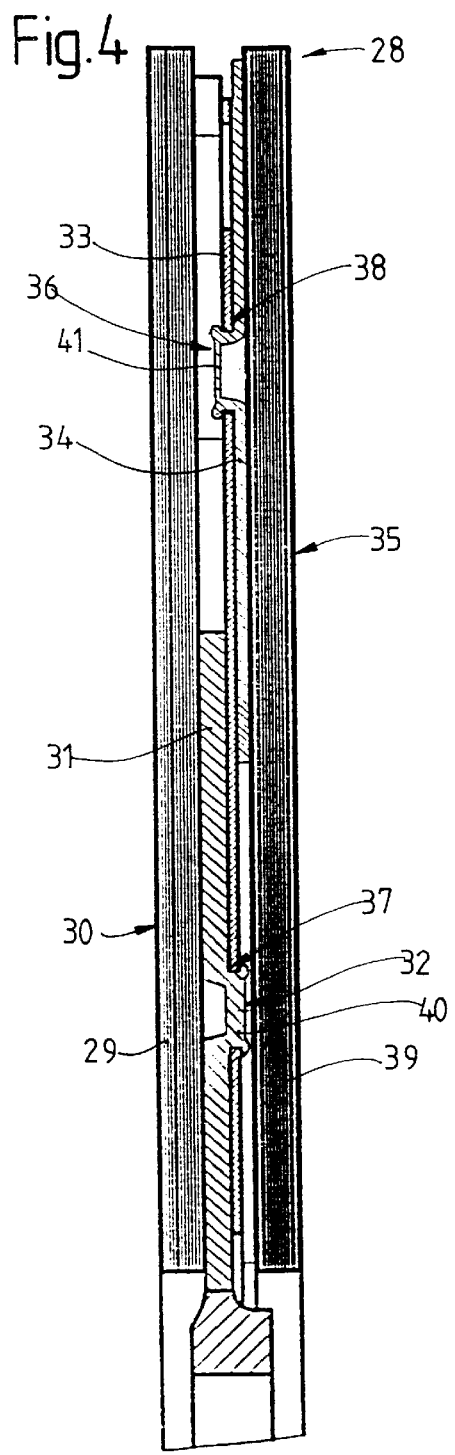

CLUTCH DISK HAVING INTEGRAL FIXING MEMBERS

BACKGROUND OF THE INVENTION

1. Field of the Invention

The invention relates to a clutch disk for a motor vehicle clutch having friction linings fixed to a lining carrier, having recesses arranged in the lining carrier and/or the friction linings, and having fixing means which are produced in one piece with the opposite component and are configured so as to engage positively behind the edges of the recesses. In addition, the invention relates to a clutch disk having a reinforcing part for holding the lining carrier or segments forming the lining carrier, and having fixing means which are arranged on the lining carrier and/or the reinforcing part and are configured so as to engage positively behind an edge of the opposite component.

2. Description of the Related Art

A clutch disk of this type is diskclosed, for example, by U.S. Pat. No. 2,630,199. In this clutch disk, the lining carrier has recesses formed as holes. The fixing means that fix the carrier plates to the lining carrier are configured as peened-over edges of the carrier plate. These peened-over edges form a collar which engages behind the edges of the recesses. Mutually opposite friction linings each have a recess in the area of the fixing means. Since the peened-over edge of one carrier plate has the same thickness as the opposite carrier plate, they do not project into the area of the lining material of the friction lining. This makes it possible to ensure that the complete wearing volume of the friction lining can be used.

The drawback with this clutch disk is that the peened-over edge can transmit only low forces. This leads to the clutch disk needing a large number of fixing means for holding the friction linings. Since the friction linings each have a recess in the friction lining in the area of the fixing means, this configuration leads to a low wearing volume of the friction lining, and therefore to rapid wear of the clutch disk.

The lining carrier of the known clutch disk is riveted to the reinforcing part. Such rivets are able to transmit high forces. During the production of the clutch disk, the rivets have to be provided separately. This leads to very costly production of the clutch disk. In addition, the rivets lead to a high number of components in the clutch disk.

SUMMARY OF THE INVENTION

The invention is based on the problem of configuring a clutch disk of the type mentioned at the beginning in such a way that it can be configured with a high wearing volume. In addition, the intention is to provide a clutch disk which can be produced particularly cost-effectively.

According to the invention, the first problem is achieved by the fixing means having a base that covers the respective recess.

By means of this configuration, the areas of the fixing means which engage behind the edges of the recess are supported by the base. The fixing means therefore have a particularly high stability, in particular under shear loading. This makes it possible for high forces to be transmitted from the friction lining to the lining carrier with few fixing means. The number of recesses in the friction lining in the area of the fixing means can be kept particularly low thanks to the invention. This means that the clutch disk according to the invention has a particularly high stability.

The second problem, namely the provision of a clutch disk which can be produced particularly cost-effectively and has a reinforcing part for holding the lining carrier or segments forming the lining carrier, said clutch disk having fixing means which are arranged on the lining carrier and/or the reinforcing part and are configured to engage positively behind an edge of the opposite component, is solved by the invention by the fastening means being produced integral, i.e., in one piece with one of the components and having a base that covers the respective recess.

By means of this configuration, rivets to be added separately during the production of the clutch disk are avoided. As a result of the single-part configuration of the fixing means with one of the components, and the base that covers the recess, high forces can be transmitted from the lining carrier to the hub. The clutch disk thereby comprises particularly few components to be assembled and may therefore be produced very cost-effectively.

As in the known clutch disk, the recesses can be formed as holes. However, a further contribution to increasing the stability of the clutch disk according to the invention is made by the recesses each being configured as a depression with a constriction which forms the edge. In addition, the depression can be produced at the same time as the fixing means by means of an appropriate shaping process using a suitable tool. This contributes to further reducing the production costs of the clutch disk according to the invention. In addition, the fixing means can be configured to be non-round in order to accommodate torsional forces.

A further contribution to reducing the production costs of the clutch disk according to the invention is made if one of two friction linings arranged on both sides of the lining carrier is connected materially to the lining carrier, if the other friction lining has a carrier plate connected materially to a layer of lining material, and if the fixing means are configured so as to connect the carrier plate to the lining carrier.

A further contribution to increasing the wearing volume of the clutch disk according to the invention is made if the layers of lining material fixed materially on the carrier plates connected by the fixing means to adjacent components have a closed surface. This may be produced, for example, if, first of all, the carrier plates are fixed to the lining carrier by means of the fixing means and then the lining material is adhesively bonded to the carrier plates.

In the clutch disk according to the invention and used in the clutch, smooth engagement is made possible if the lining carrier has a lining spring.

The clutch disk according to the invention may be assembled particularly simply in any desired sequence if carrier plates of the friction linings each have recesses for fixing means of the opposite carrier plate on the lining carrier. This means that the fixing means are accessible from both sides of the clutch disk, so that a punch and a die for producing the fixing means can be applied simply.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

Other objects and features of the present invention will become apparent from the following detailed description considered in conjunction with the accompanying drawings.

It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 1 shows a plan view of half a clutch disk according to the invention;

FIG. 2 shows a much enlarged sectional illustration through a radially outer area of the clutch disk from FIG. 1, along the line II—II;

FIG. 3 shows a sectional illustration through a radially outer area of a further embodiment of the clutch disk according to the invention; and FIG. 4 shows a sectional illustration through a radially outer area of a clutch disk according to the invention having a lining spring.

DETAILED DESCRIPTION OF THE PRESENTLY PREFERRED EMBODIMENTS

FIG. 1 shows a plan view of half a clutch disk 1 having a reinforcing part 2 formed as a hub part and having a lining carrier 3 fixed to the reinforcing part 2. The lining carrier 3 is composed of segments 4 and, on its end sides, in each case holds a number of friction linings 5, 6. The reinforcing part 2 has recesses 7 to accommodate springs (not illustrated) of a torsional vibration damper. By means of the torsional vibration damper, the reinforcing part 2 can be connected to a hub which is likewise not illustrated but produces a rotationally fixed connection to a shaft. The friction linings 5, 6 are positively connected to the lining carrier 3 by fixing means or members 8.

FIG. 2 shows, in a much enlarged sectional illustration through the clutch disk 1 along the line II—II from FIG. 1, that the friction linings 5, 6 each have layers 11, 12 of lining material connected materially to carrier plates 9, 10. The layers 11, 12 of the lining material have a recess 13 in the area of the fixing means 8. The fixing means 8 are formed as plastic deformation members of the carrier plate 9, 10 and extend through the recesses to engage behind an edge of a recess 14 arranged in the lining carrier 3. In this case, the recess 14 is formed as a hole. The fixing means 8 each have a base 15 with which they cover the recess 14. This means that the fixing means 8 has a particularly high stability. Since the fixing means 8 are formed by shaping one of the carrier plates 9, 10, the areas which penetrate the lining carrier 3 have a lower elevation than the carrier plate 9, 10 of the opposite friction lining 5, 6. This means that the entire wearing volume of the friction linings 5, 6 can be used.

FIG. 3 shows a clutch disk 16 in a longitudinal section through a lining carrier 17 and adjacent areas of a reinforcing part 18. Here, it is possible to see that the reinforcing part 18 has a recess 19 behind whose edge a fixing means 20 produced in one piece with the lining carrier 17 engages. The fixing means 20 is therefore constructed in the same way as the fixing means 8 illustrated in FIG. 2 and fixes the lining carrier 17 positively to the reinforcing part 18. Of course, the fixing of the lining carrier 17 to the reinforcing part 18 may also involve a large number of fixing means 20. In order to simplify the drawing, only a single fixing means 20 is illustrated. Friction linings 21, 22 of the clutch disk 16 are fixed to the lining carrier 17 with fixing means 23, like those friction linings from FIGS. 1 and 2. This means of fixing differs from that from FIGS. 1 and 2 primarily in that recesses 24 in the lining carrier 17 are formed as a pot-like depression with a constriction 25. The respective fixing means 20 engages behind the constriction 25. The fixing means 20, 23 have a base 26, 27 that covers the respective recess 19, 24.

FIG. 4 shows a clutch disk 28 in which a layer 29 of lining material of a friction lining 30 is connected materially and directly to a lining carrier 31. On the opposite side, the lining carrier 31 is connected positively to a lining spring 33 by fixing means 32. For its part, the lining spring 33 is connected to a carrier plate 34 of a second friction lining 35 by fixing means 36. The second friction lining 35 has a layer 39 of lining material fixed materially to the carrier plate 34. The fixing means 32, 36 engage behind edges of recesses 37, 38, configured as holes, in the respective opposite component. In addition, FIG. 4 shows that the layers 29, 39 of the lining material have a continuous closed surface, i.e., there is no opening in the face continuity of the lining material, and therefore a particularly high wearing volume. The fixing means 32, 36 have a base 40, 41 that covers the respective recess 37, 38. In order to produce the clutch disk 28, first of all the lining carrier 31 can be connected to the lining spring 33 and the carrier plate 34. Then, the layers 29, 39 of the lining material can be firmly adhesively bonded to the areas provided on the clutch disk 28.

The invention is not limited by the embodiments described above which are presented as examples only but can be modified in various ways within the scope of protection defined by the appended patent claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A clutch disk, comprising:
   a lining carrier;
   a reinforcing part coaxial with the lining carrier; and
   fixing members for fixing said lining carrier to said reinforcing part, said fixing members being integral with one of said lining carrier and said reinforcing part, an other of said lining carrier and said reinforcing part having recesses through which said fixing members extend to positively engage an edge of said recesses, said fixing members each having a base that covers the recess through which it extends.

2. A clutch disk according to claim 1, wherein the recesses are each configured as a depression with a constriction defining the recess edge, the fixing members engaging behind the constriction.

3. A clutch disk according to claim 1, wherein the fixing members are integral with said lining carrier, the recesses being in said reinforcing part.

4. A clutch disk according to claim 1, wherein friction material linings are disposed at each of opposite sides of said lining carrier, the friction material lining at one side of said lining carrier being fixed directly to said lining carrier one side, further comprising:

a carrier plate, the friction material lining at the opposite side of said lining carrier being fixed to said carrier plate, said lining carrier and said carrier plate each having fixing members, the fixing members of said lining carrier and the fixing members of said carrier plate extending through and engaging positively behind edges of recesses in a respective opposite component of said clutch disk.

5. A clutch disk according to claim 4, wherein the friction material linings fixed to said lining carrier and said carrier plate each have a continuous closed surface.

6. A clutch disk according to claim 4, wherein the friction material linings are adhesively fixed to said lining carrier and said carrier plate.

7. A clutch disk according to claim 1, further comprising:

carrier plates at each of opposite sides of said lining carrier; and friction linings on each of said carrier plates, a carrier plate at one side of said lining carrier having recesses for receiving friction lining fixing members of the carrier plate at the opposite side of said lining carrier and, vice-versa.

8. A clutch disk according to claim 4, further comprising a lining spring; the recesses in which the fixing members of said lining carrier and said carrier plate engage being in said lining spring.

* * * * *